United States Patent
Stacye (10) Patent No.: US 11,788,294 B2
(45) Date of Patent: Oct. 17, 2023

(54) DOWNSPOUT SOUND TREATMENT SYSTEM AND METHOD

(71) Applicant: Douglas M. Stacye, Greenwood, MO (US)

(72) Inventor: Douglas M. Stacye, Greenwood, MO (US)

( * ) Notice: Subject to any disclaimer, the term of this patent is extended or adjusted under 35 U.S.C. 154(b) by 0 days.

(21) Appl. No.: 17/352,593

(22) Filed: Jun. 21, 2021

(65) Prior Publication Data
US 2021/0396014 A1 Dec. 23, 2021

Related U.S. Application Data (60) Provisional application No. 63/041,635, filed on Jun. 19, 2020.

(51) Int. Cl.
| | | |
|---|---|---|
| *E04D 13/00* | (2006.01) | |
| *F16F 1/36* | (2006.01) | |
| *E04D 13/08* | (2006.01) | |

(52) U.S. Cl.
CPC .......... *E04D 13/008* (2013.01); *E04D 13/08* (2013.01); *F16F 1/3605* (2013.01)

(58) Field of Classification Search
CPC ... E04D 13/08; E04D 13/008; E04D 13/0645; E04D 13/0767; E04D 2013/084; F16F 1/3605; F16F 2224/025
USPC .......................................... 52/11, 12, 13, 16
See application file for complete search history.

(56) References Cited

U.S. PATENT DOCUMENTS

| | | | | |
|---|---|---|---|---|
| 4,437,283 A | * | 3/1984 | Benoit .................... | E04D 5/146 52/96 |
| 4,837,987 A | * | 6/1989 | Fender .................. | E04D 13/076 52/11 |
| 4,853,067 A | * | 8/1989 | Annas, Sr. ............. | A47C 31/02 156/522 |
| 4,875,896 A | * | 10/1989 | Kurtz .................. | A61M 5/3216 128/DIG. 26 |
| 5,051,870 A | * | 9/1991 | Companion .......... | H01L 23/544 361/767 |
| 5,159,789 A | * | 11/1992 | Haapanen ............... | E04D 13/08 52/12 |
| 5,220,755 A | * | 6/1993 | Roles ...................... | E04D 13/08 24/19 |
| 5,549,516 A | * | 8/1996 | Heddon ................... | A63D 1/04 473/115 |
| 5,817,413 A | * | 10/1998 | Huddleston ............. | B32B 25/04 138/DIG. 6 |
| 5,859,114 A | * | 1/1999 | Davis ..................... | E04D 5/142 525/240 |

(Continued)

*Primary Examiner* — Brian E Glessner
*Assistant Examiner* — Adam G Barlow
(74) *Attorney, Agent, or Firm* — Law Office of Mark Brown, LLC; Christopher M DeBacker (57) ABSTRACT

A vibration and sound deadening treatment applied to the exterior of downspouts or other gutter pieces which quiets any sound generated when water or other weather contacts the downspout. When placed on the exterior of the downspout, especially near turns in the spout, sound generated by rain and water moving through the downspout is dampened by reducing or removing completely the vibrations generated by the rain and water. This prevents the need to place anything inside of the downspout that may wind up clogging the spout and drain.

12 Claims, 6 Drawing Sheets

(56) References Cited

U.S. PATENT DOCUMENTS

| | | | | |
|---|---|---|---|---|
| 5,894,700 | A * | 4/1999 | Sweet | B32B 21/04 |
| | | | | 52/390 |
| 5,935,668 | A * | 8/1999 | Smith | B32B 21/00 |
| | | | | 428/167 |
| 6,071,621 | A * | 6/2000 | Falaas | C23C 14/20 |
| | | | | 428/912.2 |
| 6,612,075 | B1 * | 9/2003 | Knoop | E04D 13/08 |
| | | | | 52/16 |
| 7,428,799 | B1 * | 9/2008 | Frelier | E04D 13/0765 |
| | | | | 52/12 |
| 7,739,839 | B1 * | 6/2010 | Crabtree | E04D 13/08 |
| | | | | 52/716.2 |
| 8,572,899 | B1 * | 11/2013 | Pearce | E04D 13/076 |
| | | | | 428/209 |
| 8,800,211 | B2 * | 8/2014 | Sharkey | E04D 13/0765 |
| | | | | 52/16 |
| 2002/0005018 | A1 * | 1/2002 | Popa | E04D 13/08 |
| | | | | 52/16 |
| 2002/0100157 | A1 * | 8/2002 | Freeman | B21F 1/00 |
| | | | | 29/424 |
| 2006/0225368 | A1 * | 10/2006 | Roe | E04D 13/0643 |
| | | | | 52/12 |
| 2008/0229673 | A1 * | 9/2008 | LaMorte | E04D 13/08 |
| | | | | 52/12 |
| 2014/0047671 | A1 * | 2/2014 | Greathouse | F16B 5/12 |
| | | | | 156/60 |
| 2014/0069028 | A1 * | 3/2014 | Lenney | E04D 13/0404 |
| | | | | 52/12 |
| 2016/0215506 | A1 * | 7/2016 | Sisler | E04F 15/02172 |
| 2019/0063071 | A1 * | 2/2019 | Dickson | E04D 13/08 |
| 2020/0347605 | A1 * | 11/2020 | Lenney | E04D 13/076 |
| 2020/0347607 | A1 * | 11/2020 | Lenney | E04D 13/068 |
| 2022/0227968 | A1 * | 7/2022 | Howard | F16F 9/0409 |

* cited by examiner

DOWNSPOUT SOUND TREATMENT SYSTEM AND METHOD

CROSS-REFERENCE TO RELATED APPLICATION

This application claims priority in U.S. Provisional Patent Application No. 63/041,635 Filed Jun. 19, 2020, which is incorporated herein by reference.

BACKGROUND OF THE INVENTION

1. Field of the Invention

The present invention relates generally to gutter and downspout systems and method for use thereof, and more specifically to a treatment system and method for quieting downspouts and gutters.

2. Description of the Related Art

Gutters and downspouts are notoriously noisy during rain storms and other weather events. Typical attempts at reducing sound from downspouts and gutters includes installing something within the downspout or gutter to absorb sound, such as carpet, sponges, pot scrubbing material, or other material made to absorb sound from impact. These solutions run the risk of coming loose and clogging the drain or downspout. They may also retain water and mildew, producing undesirable smells.

Heretofore there has not been available a system or method for a downspout sound treatment system with the advantages and features of the present invention.

BRIEF SUMMARY OF THE INVENTION

The present invention generally provides a vibration and sound deadening treatment applied to the exterior of downspouts or other gutter pieces which quiets any sound generated when water or other weather contacts the downspout. An embodiment may use the HushMat® material manufactured by RMD, LLC of Olathe, Kans. Other suitable vibration damping materials can be used as well.

When placed on the exterior of the downspout, especially near turns in the spout, sound generated by rain and water moving through the downspout is dampened by reducing or removing completely the vibrations generated by the rain and water. This prevents the need to place anything inside of the downspout that may wind up clogging the spout and drain.

In a preferred embodiment, the material applied to the downspout comes in a sheet having an adhesive on one side allowing it to be affixed to the metal surface of the downspout. A paintable foil backing is located on the exposed side of the material. A paper cover may protect the adhesive until the product is ready to be applied. The sound absorbent and vibration damping material may be a rubber-type material or any other suitable vibration damping material.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Downspout Damping System 2

Figure 1:
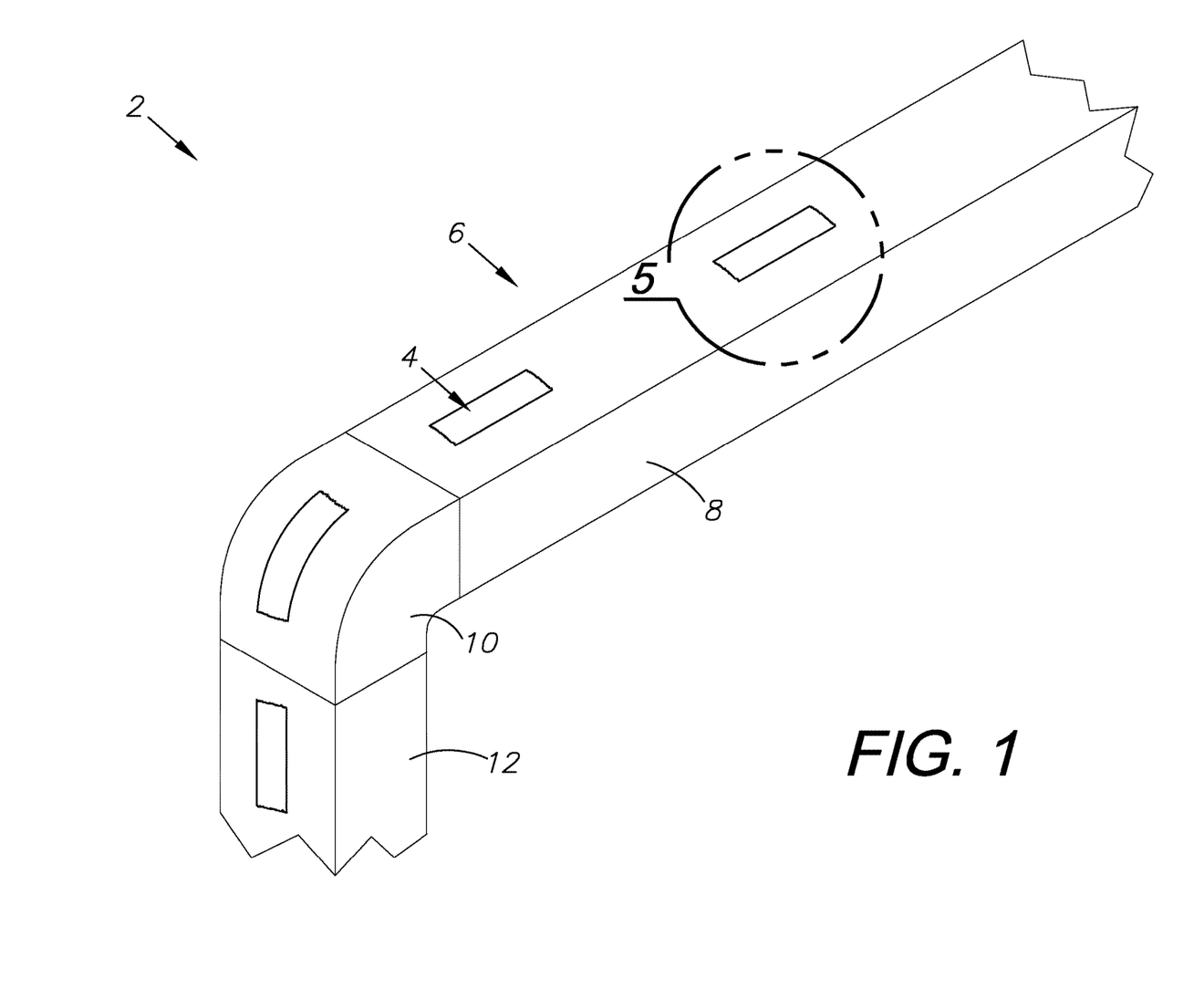
FIG. 1 is a three-dimensional isometric view a noise-dampening agent applied to a down spout exterior.
Figure 2:
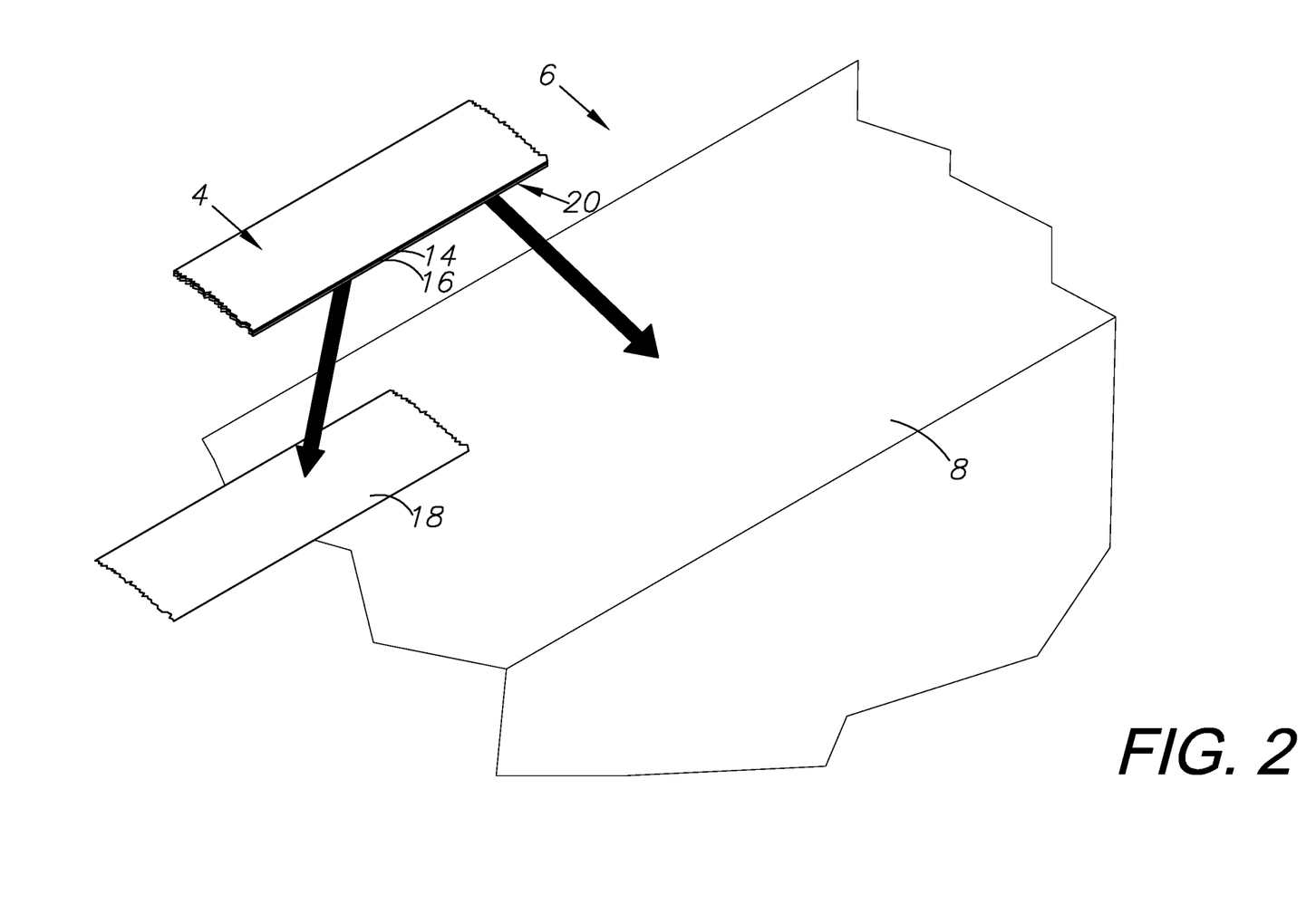
FIG. 2 is a three-dimensional isometric view showing a noise-dampening agent in proximity with a portion of a down spout exterior.

As shown in FIG. 1, a vibration and sound damping agent 4 is applied to a gutter system 6 downspout 8 or other gutter section by removing a paper cover 18 on the underlying sound damping material 16, exposing the adhesive face 20 thereof. FIG. 1 also shows additional damping agents 4 installed on an elbow 10 and extension 12 portion of the gutter 6. The damping material 4 could be applied on any element of the gutter system 6. FIG. 2 shows how the sound damping agent 4 is applied to the exterior of the downspout 8, once the paper backing 18 has been removed. A top protective layer 14 is placed atop the damping material layer 16 which also includes an adhesive for bonding to the exterior of the downspout 8 or some other gutter element.

Figure 3:
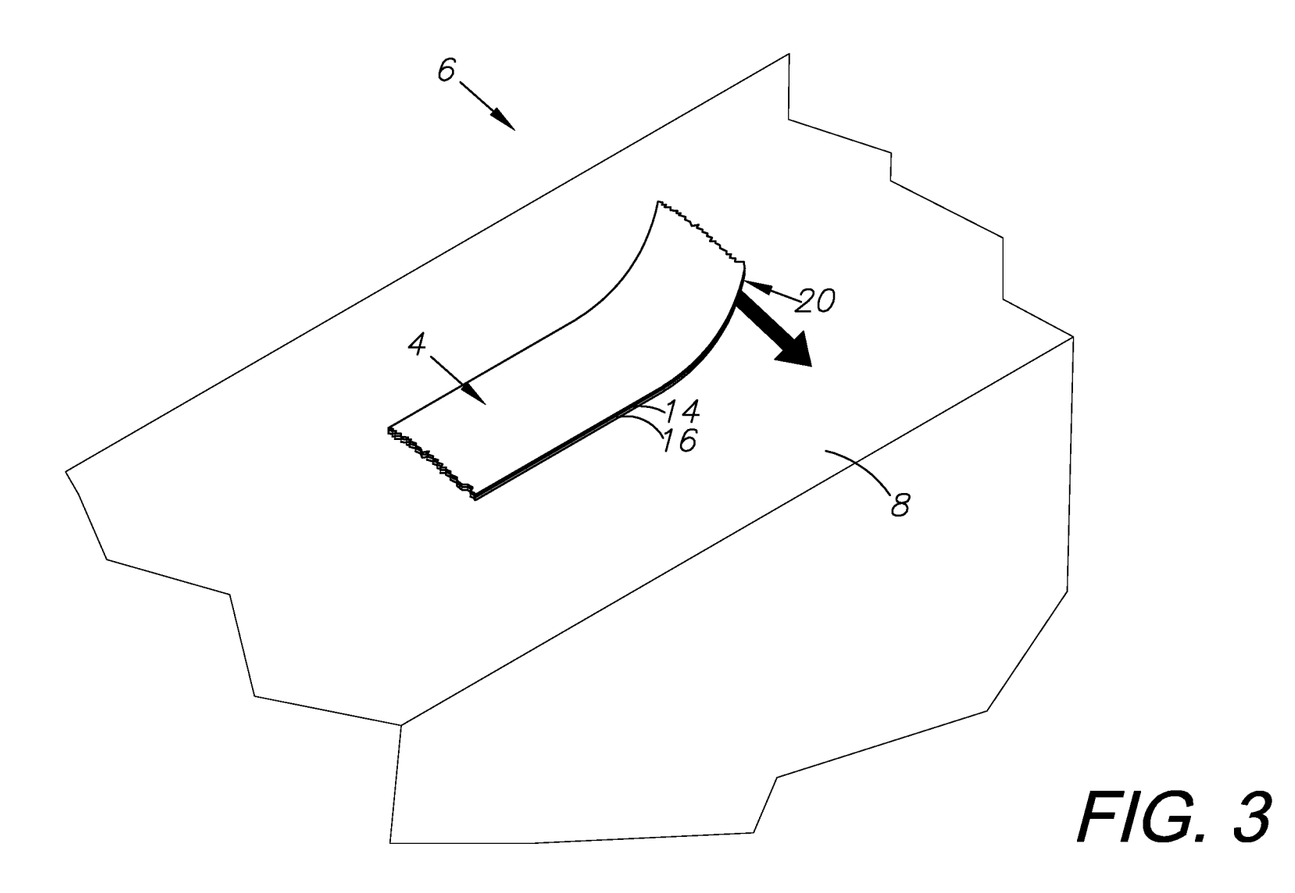
FIG. 3 is three-dimensional isometric view thereof shown with the noise-dampening agent being installed onto the down spout exterior.
Figure 4:
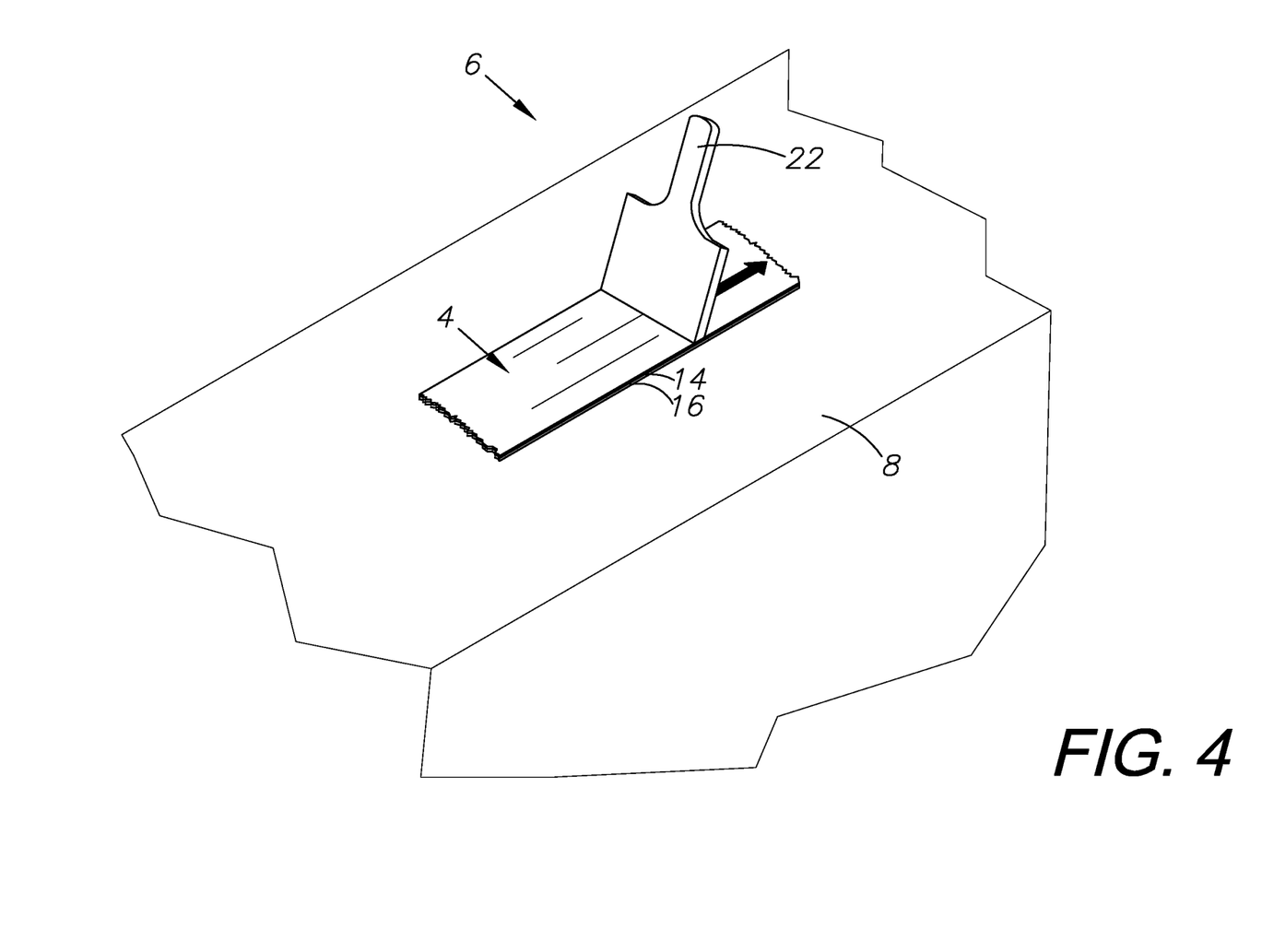
FIG. 4 is a three-dimensional isometric view thereof showing a tool deployed for installing the noise-dampening agent onto the down spout exterior.
Figure 5:
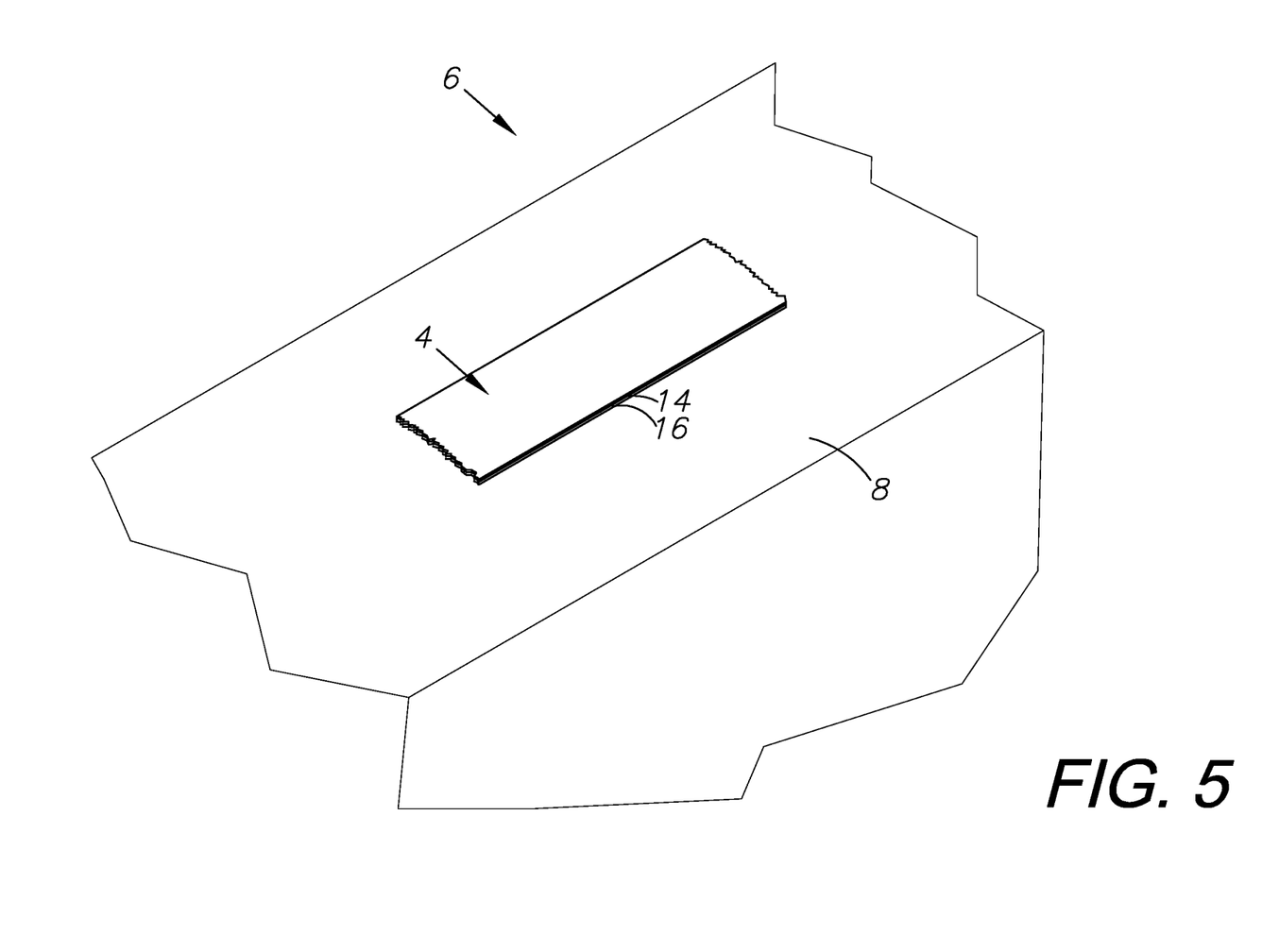
FIG. 5 is a detailed three-dimensional isometric view taken about the circle of FIG. 1.
Figure 6:
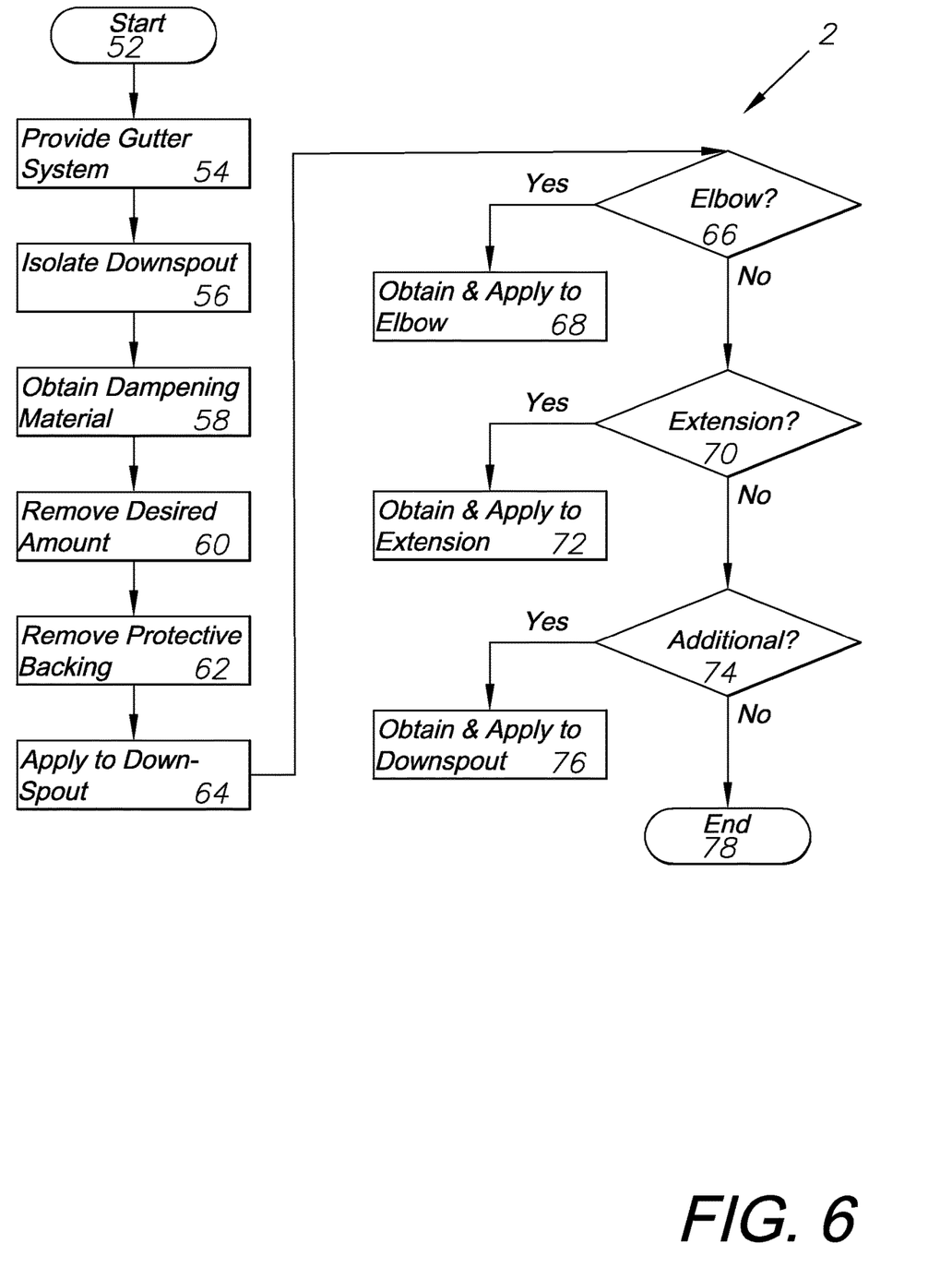
FIG. 6 is a flow chart diagramming the steps taken in practicing an embodiment of the present invention.

As shown in FIG. 3, the adhesive face of the damping material 16 is then placed against the surface of the downspout and pressed to apply. FIG. 4 then shows how the damping material 4 can be smoothed against the surface of the downspout 8 using a spreader tool 22. The exterior protective layer 14 of the damping material 4 could match the color of the gutter system 6, could be paintable, or could simply be a foil material. FIG. 5 shows the damping element 4 fully installed on the exterior of the gutter downspout 8. This damping element 4 can be reinforced with additional damping elements being placed elsewhere in the gutter system 6. Over time they can be replaced or reinforced with additional damping elements. The damping elements may come in a roll, where the paper backing 18 prevents the adhesive face 20 of the damping material 16 from accidentally sticking to the damping element 4. Portions can be cut or torn off of the roll to be placed on the exterior of the gutter section.

FIG. 5 diagrams the steps in practicing an embodiment of the present invention. The process beings at 52 where a gutter system is provided at 54. This gutter system could be new or could be existing and already installed on a structure.

The downspout portion of the gutter system is isolated at 56. This means the downspout portion may be removed or the process could be performed with the downspout in place in an installation. The damping material is obtained at 58 and a desired amount of the damping element is removed at 60. The paper backing is removed at 62 and the first piece of damping material is placed on the downspout at 64 using the steps shown in FIGS. 2-4.

If an elbow element exists at 66, the user could place more damping material along the back of the elbow 68 as shown in FIG. 1. Similarly, if an extension portion exists extending away from the downspout at 70, additional damping material can be placed on the extension as shown in FIG. 1 at 72. Any additionally desired damping material at 74 can be placed as the user desires at 76, along the downspout 8 or any other areas of the duct system 6. The process ends either way at 78 once the user has placed a desired number of damping elements 4 onto the gutter system 6.

When rain water or other weather effects would otherwise generate noise in the downspout, the sound is instead deadened by reducing or removing the vibrations generally generated thereby. As shown in those figures, a paintable foil backing 14 is on the exposed side of the treatment material which allows for painting the treatment material to match the downspout. Not shown is the step of taking the spreader tool 22 and pressing the end thereof against the exterior layer 14 of the noise damping element 4, removing air trapped between the adhesive face 20 and the exterior face of the downspout 8.

The sound dampening material 16 in a preferred embodiment would use a compounded blend of butyl rubbers such as the HushMat® material manufactured by RMD, LLC of Olathe, Kans. or some other suitable material applied to the exterior of the downspout. The material does not require a separate material to provide the adhesive face, thus the face of the sound damping layer 16 actually forms the adhesive face 20. The material optimally dampens vibrations within the metal of the gutter system 6 when rain water or other material makes contact with the gutter material, which would otherwise cause vibrations and noise.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A noise-dampening system for a downspout, the system comprising:
   a noise damping element comprising an exterior layer, an interior layer, and a selectively removable protective layer;
   said interior layer comprised of a noise damping material and having an adhesive face;
   said selectively removable protective layer having a first orientation covering said adhesive face and a second orientation being removed from said adhesive face;
   said adhesive face configured for being placed against an exterior face of a portion of said gutter system, thereby affixing said noise damping element to said exterior face of said gutter system portion;
   a spreading tool having a handle end and a spreader end;
   said spreader end configured for contacting the exterior layer of said noise damping element;
   said spreader further configured to remove air bubbles from between said adhesive face of aid interior layer and said exterior face of said gutter system portion; and
   said noise damping material further configured to reduce vibrations within said portion of said gutter system, thereby reducing noise from said gutter system.

2. The system of claim 1, further comprising said interior layer and noise damping material and said adhesive face comprise the same, uniform material.

3. The system of claim 2, further comprising said uniform material comprises a compounded blend of butyl rubbers.

4. The system of claim 1, further comprising said exterior layer comprises a paintable, protective exterior face.

5. A noise-dampening system for a downspout, the system comprising:
   the downspout comprising a vertical portion, an elbow portion, and an extension portion;
   a plurality of noise damping elements, each comprising an exterior layer, an interior layer, and a selectively removable protective layer;
   each said interior layer comprised of a noise damping material and having an adhesive face;
   each said selectively removable protective layer having a first orientation covering said adhesive face of said respective interior layer and a second orientation being removed from said adhesive face of said respective interior layer;
   each said adhesive face configured for being placed against a respective exterior face of one of said downspout portion, said elbow portion, and said extension portion, thereby affixing said noise damping element to a respective exterior face of one of said gutter system downspout portion, elbow portion, and extension portion;
   said noise damping material further configured to reduce vibrations within said respective portion of said gutter system, thereby reducing noise from said gutter system;
   a spreading tool having a handle end and a spreader end;
   said spreader end configured for contacting the exterior layer of said noise damping element; and
   said spreader further configured to remove air bubbles from between said adhesive face of aid interior layer and said exterior face of said gutter system portion.

6. The system of claim 5, further comprising said interior layer and noise damping material and said adhesive face comprise the same, uniform material.

7. The system of claim 6, further comprising said uniform material comprises a compounded blend of butyl rubbers.

8. The system of claim 5, further comprising said exterior layer comprises a paintable, protective exterior face.

9. A method of reducing sound in a downspout, the method comprising the steps:
   providing a noise damping element comprising an exterior layer, an interior layer, and a selectively removable protective layer affixed to said interior layer;
   obtaining, from said noise damping element, a desired portion of said noise damping element;

removing said selectively removable protective layer from said desired portion of said noise damping element, thereby exposing an adhesive face of said interior layer;

placing said adhesive face of said interior layer against an exterior face of a portion of said gutter system, thereby affixing said noise damping element to said exterior face of said portion of said gutter system;

proving a spreading tool having a handle end and a spreader end;

contacting the exterior layer of said noise damping element with said spreader end;

pushing said spread end along said exterior layer of said noise damping element, thereby removing air bubbles from between said adhesive face of aid interior layer and said exterior face of said gutter system portion; and thereby reducing vibrations within said portion of said gutter system with said noise damping material, thereby reducing noise from said gutter system.

10. The method of claim 9, wherein said interior layer and noise damping material and said adhesive face comprise the same, uniform material.

11. The method of claim 10, wherein said uniform material comprises a compounded blend of butyl rubbers.

12. The method of claim 9, wherein said exterior layer comprises a paintable, protective exterior face.

\* \* \* \* \*